United States Patent
Gloaguen

(10) Patent No.: US 6,932,356 B2
(45) Date of Patent: Aug. 23, 2005

(54) PROTECTIVE COVERS

(75) Inventor: Didier Gloaguen, Saint Philbert de Grand Lieu (FR)

(73) Assignee: Trelleborg AB, Trelleborg (SE)

( * ) Notice: Subject to any disclaimer, the term of this patent is extended or adjusted under 35 U.S.C. 154(b) by 27 days.

(21) Appl. No.: 10/004,984

(22) Filed: Dec. 3, 2001

(65) Prior Publication Data

US 2002/0079154 A1 Jun. 27, 2002

(30) Foreign Application Priority Data

Dec. 5, 2000 (GB) .............................................. 0029621

(51) Int. Cl.⁷ ................................................ F16J 3/00
(52) U.S. Cl. ........................ 277/636; 277/928; 464/175
(58) Field of Search ............................ 277/634–6, 928; 464/175

(56) References Cited

U.S. PATENT DOCUMENTS

| | | | | |
|---|---|---|---|---|
| 3,041,885 A | * | 7/1962 | Christiansen | 403/50 |
| 3,927,576 A | * | 12/1975 | Colletti | 74/498 |
| 4,224,808 A | | 9/1980 | Gehrke | |
| 4,529,213 A | * | 7/1985 | Goodman | 277/636 |
| 4,559,025 A | * | 12/1985 | Dore | 464/175 |
| 4,642,067 A | * | 2/1987 | Geisthoff et al. | 464/175 |
| 4,904,394 A | * | 2/1990 | Clarke et al. | 210/739 |
| 5,052,451 A | * | 10/1991 | Gentilcore et al. | 141/67 |
| 5,078,652 A | * | 1/1992 | Baker | 464/175 |
| 5,126,712 A | * | 6/1992 | Sugiyama | 335/278 |
| 5,308,284 A | * | 5/1994 | Renzo et al. | 464/175 |
| 5,472,072 A | * | 12/1995 | Bumgarner | 188/322.12 |
| 5,568,930 A | * | 10/1996 | Urbach | 277/635 |
| 6,006,651 A | * | 12/1999 | Pierce et al. | 92/63 |
| 6,328,498 B1 | * | 12/2001 | Mersch | 403/175 |

FOREIGN PATENT DOCUMENTS

| | | | |
|---|---|---|---|
| DE | 2304042 | * | 8/1974 |
| EP | 0 299 261 A1 | | 1/1989 |
| GB | 1384012 | | 2/1975 |
| GB | 1475246 | | 6/1977 |
| GB | 1488542 | | 10/1977 |
| GB | 2012022 | | 7/1979 |

* cited by examiner

Primary Examiner—Alison K. Pickard
(74) Attorney, Agent, or Firm—Leydig, Voit & Mayer, Ltd.

(57) ABSTRACT

A protective cover which is generally in the form of a flexible bellows construction secured at each end by collars in order to define an interior space includes vent means. Thus, when the cover is deformed, the volume within the interior is altered by aspiration or evacuation through the vent means. The vent means includes a vent element in order to allow air or fluid transfer into and out of the interior but prevent ingress of contaminants such as grit and water to the interior.

15 Claims, 3 Drawing Sheets

PROTECTIVE COVERS

BACKGROUND TO THE INVENTION

The invention relates to protective covers and more particularly but not exclusively to protective covers for protecting moving parts in a mechanism of motor vehicles.

SUMMARY OF THE INVENTION

According to the invention, there is provided a protective cover for a motor vehicle joint, the cover having a deformable structure defining an interior space closed at both ends and including vent means coupled to the interior space, the vent means including a vent element adapted to allow fluid flow thereacross whilst stopping contaminant and/or water entering into the interior space whereby excess fluid pressure within the interior can be reduced by fluid evacuation and aspiration through the vent means.

Typically, the fluid will be air.

Protective covers embodying the invention will now be described, by way of example with reference to the accompanying diagrammatic drawings in which:

DESCRIPTION OF THE PREFERRED EMBODIMENTS

Figure 5:
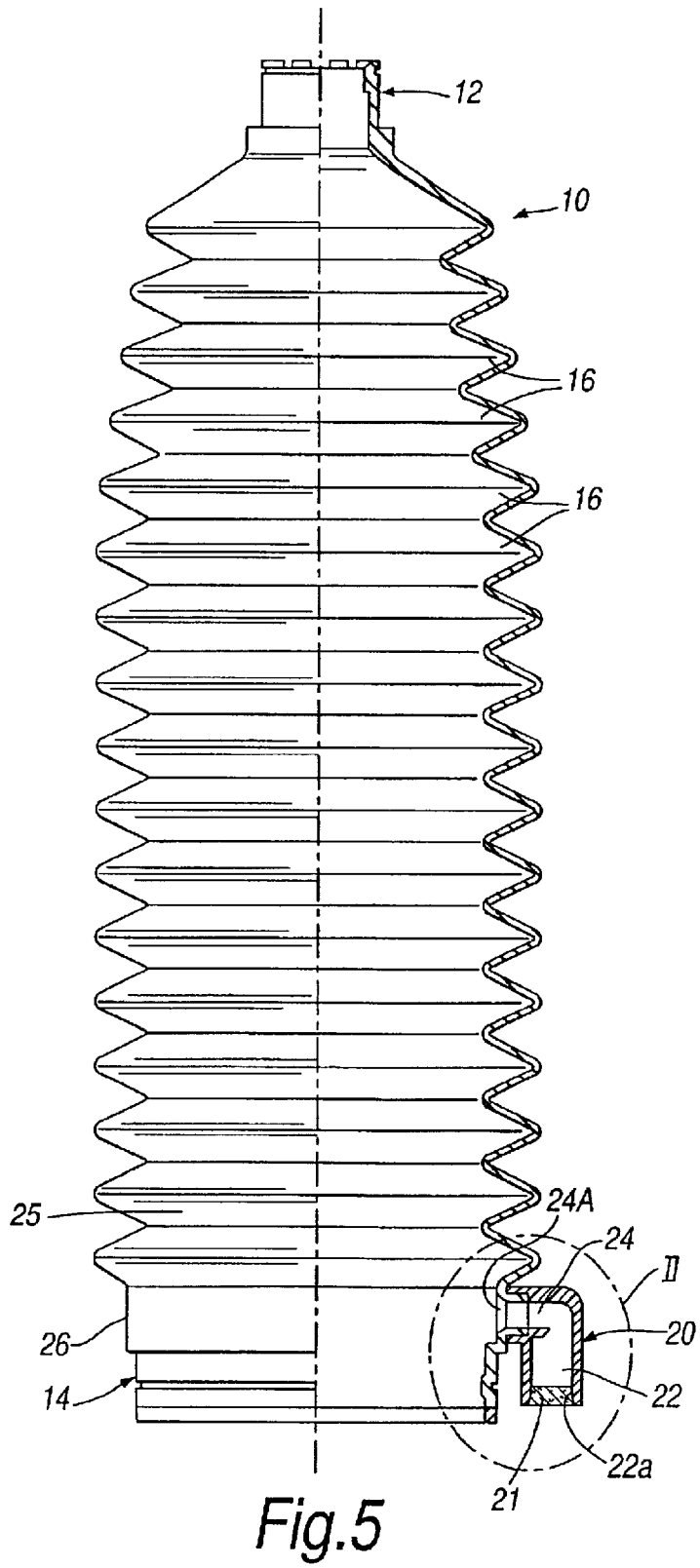
FIG. 5 is a cross-section through one of the protective covers embodying the invention.
Figure 6:
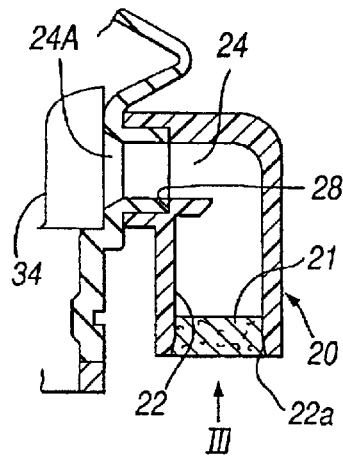
FIG. 6 is an enlarged view of the portion of FIG. 5 shown at II.
Figure 7:
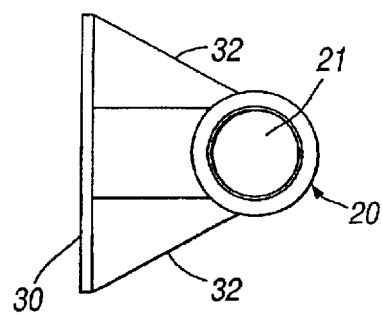
FIG. 7 is an end view of part of a connector shown in FIG. 6, looking in the direction of the arrow III.

The protective cover arrangement 10 shown in FIGS. 5 and 6 comprises a small diameter sealing collar 12 at one end and a larger diameter sealing collar 14 at the opposite end, with a plurality of bellows turns 16 integrally extending between the two ends. In use, the two sealing collars are attached to two relatively movable parts of a mechanism (not shown) which is to be protected in a motor vehicle. The cover 10 protects the mechanism from ingress of water, dirt and other contamination.

Figure 1:
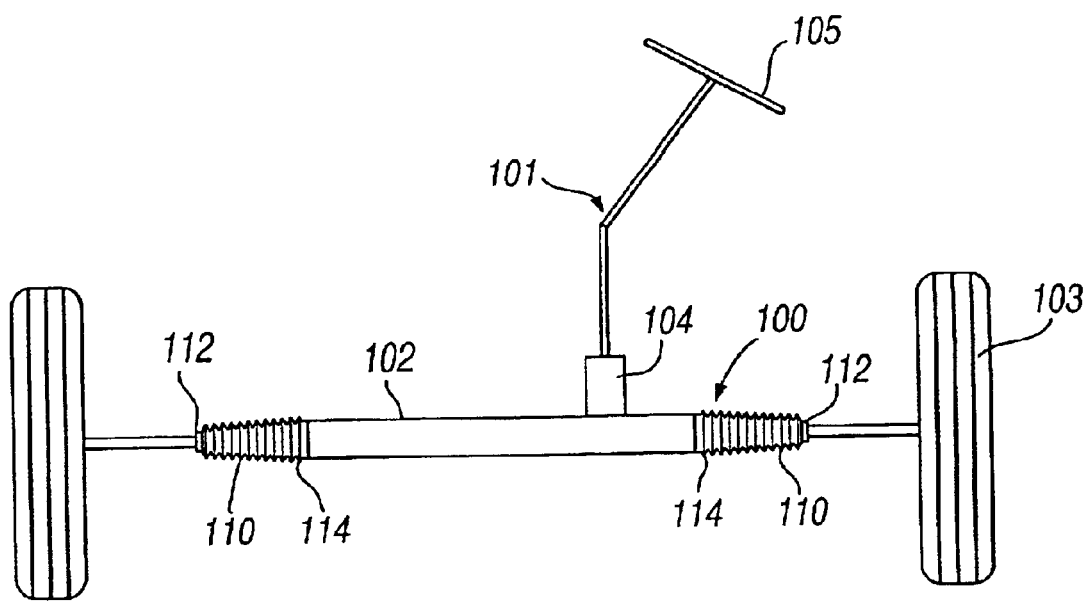
FIG. 1 is a schematic front elevation of a steering arrangement with protective covers.
Figure 2:
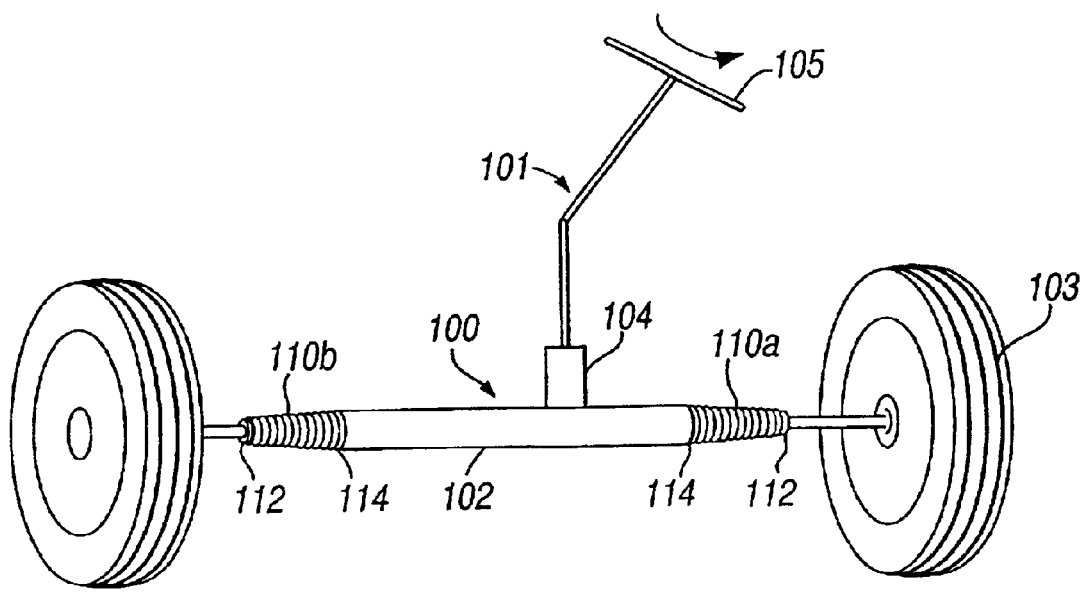
FIG. 2 is a schematic front elevation of the steering arrangement depicted in FIG. 1 turned to the right.
Figure 3:
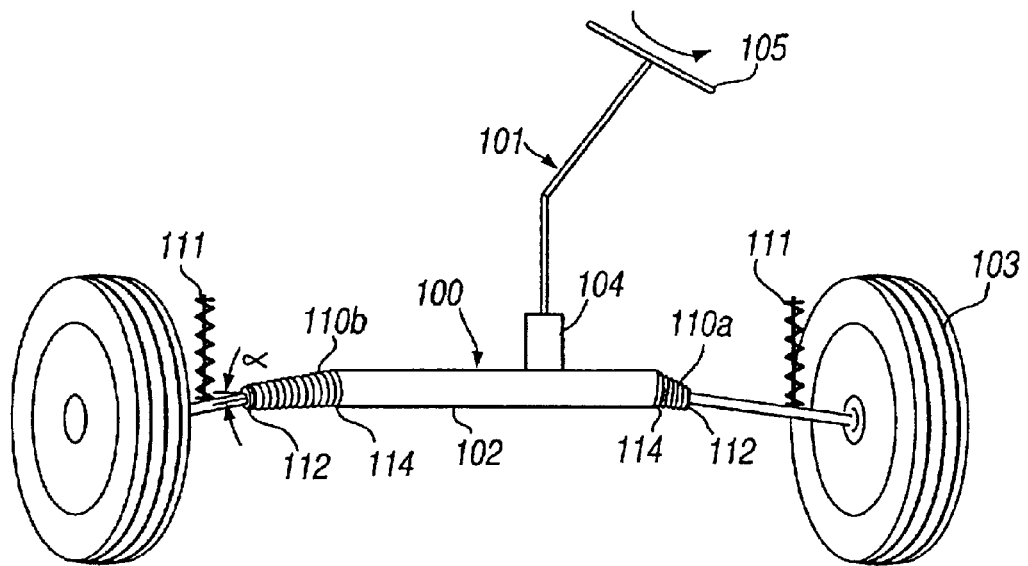
FIG. 3 is a schematic front elevation of the steering arrangement depicted in FIGS. 1 and 2 turned to the right and subject to suspension articulation.

In one particular application of the protective cover shown in FIGS. 1 to 3, two of them are respectively mounted to protect the ends of a steering rack of a steering arrangement 100 in a vehicle. Thus, the steering arrangement 100 may comprise a steering box 104 operated directly by the driver's steering wheel 105 or through the intermediary of a power steering arrangement. A steering rack extends outwardly in opposite directions from each side of the steering box 104 and is moved axially in one or the other direction by the steering box in response to steering action by the driver. The opposite ends of the rack are connected to turn the steerable wheels 103 of the vehicle. In use, a cover 110 extends from one side of the steering box 104, with its larger diameter fixing collar 114 being secured to the steering box 104 where the steering rack extends outwardly therefrom. The smaller diameter collar 112 of the cover 110 is secured to the distal end of the rack.

At the opposite side of the steering box 104, from which the second end of the rack protrudes, a second cover 110 is secured, with its smaller diameter collar 112 fixed to that distal end of the steering rack.

The two protective covers 110 thus protect the two end portions of the rack and the bellows flexibly accommodate axial movement.

As the steering rack moves to and fro, in order to carry out desired steering action, the two protective covers 110 will be alternately compressed and expanded as will now be explained in more detail.

It will be noted from FIG. 1 that the steering arrangement depicted has wheels 103 in a straight-ahead configuration. Thus, the steering box 104 is not displacing the steering rack either to the right or the left. In such circumstances, the protective covers 110 are not generally deformed (that is, not compressed or stretched), and so the interior volumes of these covers 110 will be substantially at their designed pressure, normally atmospheric. Thus, these covers 110 should not rupture, create noise problems or alter the function of the underlying steering mechanism.

In FIG. 2, the steering arrangement of FIG. 1 has been turned to the right. Thus, cover 110a is compressed whilst cover 110b is expanded. The covers 110 are sealed by collars 112, 114 at each end. Therefore, the compressed cover 110a would normally be at an elevated pressure whilst the expanded cover 110b would be at a reduced pressure.

Similarly, in FIG. 3, the covers 110 are respectively further expanded (110b) and compressed (110a) by suspension 111 movement to accommodate bumps as the vehicle including the steering arrangement moves.

Figure 4:
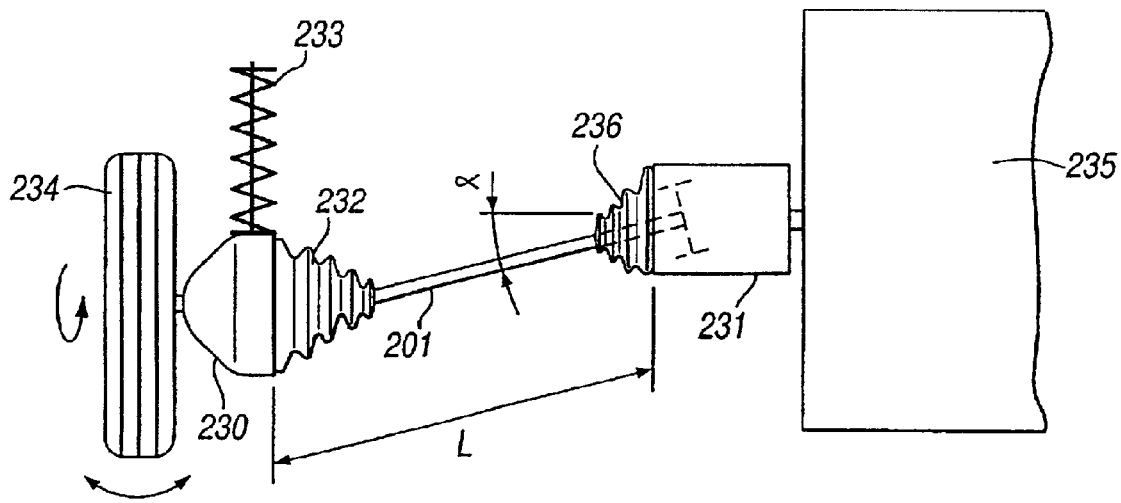
FIG. 4 is a schematic front elevation of a transmission arrangement with protective covers.

FIG. 4 shows how a similar problem can arise with a drive shaft or transmission arrangement. A drive shaft 201 extends between an outboard joint 230 and an inboard joint 231. The outboard joint 230 is supported by a suspension 233 and the wheel 234.

In such circumstances, the protective covers 232 can be angled and the protective cover 236 can be compressed or expanded. The pressure variation appears only in the inboard joint 231.

It is necessary to accommodate the resultant changes in pressure in the protective covers. If this is not done, excessive pressure may rupture the protective covers. One known way of dealing with this problem, is to interconnect the interiors of the two covers used at respective ends of a steering rack. In this way, when one cover is contracted by movement of the steering rack, the increased pressure within the now deformed cover is transmitted to the interior of the other cover which will at the same time be expanded.

In accordance with a feature of the covers being described, this interconnection between the two bellows at opposite ends of the steering rack is removed in order to allow easier assembly and to reduce costs.

Referring to FIG. 5, the bellows 10 there shown has a vent arrangement 20 at one end. The vent 20 is L-shaped in form, comprising a relatively long hollow tubular part 22 and a relatively short hollow tubular part 24. Each part 22,24 has an open end 22A,24A. As shown in FIGS. 5 and 6, the vent 20 is secured in position on the cover 10 so that the end 24A is attached to the wall of the bellows adjacent the larger diameter collar 14 and with the hollow interior of the part 24 thus open to the interior 25 of the cover 10. The part 24 of the vent 20 thus extends radially of the major axis of the cover 10 and the part 22 of the connector extends in an axial direction.

Such a bellows 10 can therefore be mounted at one end of a steering rack (for example, as shown in FIGS. 1 to 3) or at one end of a drive shaft (for example, as shown in FIG. 4). A similar bellows would then be mounted at the other end of the steering rack or drive shaft.

The vent 20 of the bellows 10 at the other end of the rack or drive shaft would be mounted on the bellows in the same way.

Each vent 20 is very firmly secured to the bellows 10. A welding operation can be used to form a very strong welded bond between the material of the vent 20 and the material of the bellows 10. In addition, a mechanical bond is formed between the vent 20 and the material of the bellows 10 where it enters the end 24A of the vent 20. However, the vent 20 could be mounted on the bellows 10 by a glueing operation.

It will be appreciated that the vent 20 can be situated at any desired position on the external wall of the bellows.

At the open end of 22a of each vent 20, a vent element 21 is located. The purpose of this element 21 is to allow air to pass into and out of the bellows 10 whilst preventing ingress of contaminants and water to the interior volume 25.

In effect, the vent 20 and the vent element 21 adjust the volume of air within the interior so that it is consistent with air pressure. In such circumstances, the vent element 21 acts as a filter to prevent transfer of contaminants, such as grit, grease, etc. and water, into the interior, allowing relatively free movement of air to adjust the volume of the interior 25 as the cover 10 is deformed in extension or compression. In such circumstances, the vent 20 prevents excessive fluid (air) pressure build-up in the interior 25 and will normally maintain that interior at about atmospheric pressure. Furthermore, with a lubricant inside the protective cover 10 it will be understood this lubricant is prevented from escaping and so facilitating continued lubrication of a protected mechanism.

The vent element 21 can be formed of a Teflon (Trade Mark) material of calibrated porosity to allow air movement but to prevent contaminants or water entering the interior 25. Clearly, the specific material used is dependent upon the installation requirements; suitable other materials may be used.

The vent 20 and vent element 21 remove the necessity of a connecting tube between the pair of protective covers 10. Thus, installation and maintenance of the cover 10 is made less difficult and costly.

In order to extend the operational life of vent element 21, it will be understood that at least a proportion of any contaminants and/or water will be removed from the element 21 as air or fluids flow out of the interior 25.

This vent works also to avoid any variation of pressure due to external temperature or atmospheric pressure variation.

I claim:

1. A protective cover for a motor vehicle articulating joint, the cover having first end, a second end, a small diameter sealing collar at said first end, a larger diameter sealing collar at said second end, a plurality of bellows turns extending between small diameter sealing collar and including vent means including a vent element adapted to allow air flow thereacross whilst stopping contaminants and/or water entering the cover whereby excess air pressure within the interior can be reduced by air evacuation and aspiration through the vent means, the vent means being a separate structure from the cover, one of said collars including extending radially outside the collar forming a radially extending hole through the collar, said material being attached to the vent means to form a coupling between the vent means and the cover.

2. A cover according to claim 1 wherein in, the vent element comprises a porosity calibrated PTFE material structure.

3. A cover as claimed in claim 2, wherein the vent element is adapted to expel at least some of any contaminates and/or water associated with it upon outward air movements through the vent element as the bellows turns and therefore the interior space is deformed.

4. A cover as claimed in claim 2, wherein the vent means is adapted to prevent lubricant escaping from the interior space.

5. A cover as claimed in claim 1, wherein the cover is a flexible bellows.

6. A cover as claimed in claim 1, wherein the cover is secured at each end with a respective collar element.

7. A cover as claimed in claim 1, wherein the air pressure within the interior is maintained at a desired air pressure.

8. A cover as claimed in claim 7, wherein the desired air pressure is that of the ambient atmospheric air pressure adjacent the protective cover.

9. A cover as claimed in claim 1, wherein the vent element is replaceable in the vent means.

10. A cover as claimed in claim 1, wherein the vent means is configured as a spout comprising a first portion outwardly perpendicular to the major axis of the cover and a second portion parallel to that major axis of the cover whereby the vent means has a substantially "L" shaped configuration.

11. A cover as claimed in claim 1, made from an elastomeric material.

12. A cover according to claim 1 wherein the coupling comprises the material being disposed within the vent means to connect the vent means to the cover.

13. A cover according to claim 1 wherein the coupling comprises mechanical bond.

14. A protective cover arrangement, comprising protective covers as claimed in claim 1 respectively secured about the ends of a steering arrangement within a motor vehicle in order to protect that steering arrangement.

15. A protective cover arrangement comprising protective covers as claimed in claim 1, secured about a motor vehicle transmission joint to protect that transmission joint.

* * * * *